US012635049B2

(12) United States Patent

Sartori et al.

(10) Patent No.: US 12,635,049 B2

(45) Date of Patent: May 19, 2026

(54) OPTIMIZED POWER MANAGEMENT IN RGB DRIVERS WITH MULTIPLEXING

(71) Applicant: Infineon Technologies AG, Neubiberg (DE)

(72) Inventors: Damiano Sartori, Padua (IT); Franco Mignoli, Verona (IT); Maurizio Galvano, Padua (IT); Adolfo De Cicco, Castel D'azzano (IT); Gabriele Borella, Padua (IT)

(73) Assignee: INFINEON TECHNOLOGIES AG, Neubiberg (DE)

( * ) Notice: Subject to any disclaimer, the term of this patent is extended or adjusted under 35 U.S.C. 154(b) by 71 days.

(21) Appl. No.: 18/886,285

(22) Filed: Sep. 16, 2024

(65) Prior Publication Data

US 2026/0082465 A1 Mar. 19, 2026

(51) Int. Cl.

*H05B 45/28* (2020.01)
*H05B 45/24* (2020.01)
*H05B 45/37* (2020.01)

(52) U.S. Cl.

CPC ............ *H05B 45/28* (2020.01); *H05B 45/24* (2020.01); *H05B 45/37* (2020.01)

(58) Field of Classification Search

None

See application file for complete search history.

(56) References Cited

U.S. PATENT DOCUMENTS 5,025,169 A * 6/1991 Arakawa .............. G01N 21/255 250/214 R
6,911,848 B2 * 6/2005 Vinciarelli ............ H02M 3/285 327/108
6,934,166 B2 * 8/2005 Vinciarelli .............. H02M 3/28 363/17
6,975,098 B2 * 12/2005 Vinciarelli ............ H02M 1/088 323/266

(Continued)

FOREIGN PATENT DOCUMENTS

GB 2504638 A * 2/2014 ............. H02M 7/00

OTHER PUBLICATIONS

Lumissil Microsystems, "8-RGB/12X2-LED Matrix LED Driver," IS31fl3752, https://www.lumissil.com/assets/pdf/core/IS31FL3752_DS.pdf, Aug. 2024, 19 pages.

(Continued)

*Primary Examiner* — Srinivas Sathiraju

(74) *Attorney, Agent, or Firm* — Slater Matsil, LLP

(57) ABSTRACT

A driving circuit includes a measurement circuit including a plurality of sensing terminals. A first sensing terminal of the measurement circuit is configured to be coupled to a first terminal of a first dissipative circuit element and a first terminal of a first light-emitting diode (LED). The first LED has a first terminal voltage. A second sensing terminal of the measurement circuit is configured to be coupled to a second terminal of the first dissipative circuit element and a first terminal of a second LED. The second LED has a second terminal voltage less than the first terminal voltage. A third (Continued)

sensing terminal of the measurement circuit is configured to be coupled to a second terminal of the first LED. A fourth sensing terminal of the measurement circuit is configured to be coupled to a second terminal of the second LED.

22 Claims, 5 Drawing Sheets

(56) References Cited

U.S. PATENT DOCUMENTS

| | | | | | |
|---|---|---|---|---|---|
| 7,439,945 | B1 * | 10/2008 | Awalt | H05B 45/10 | 345/83 |
| 8,369,116 | B2 * | 2/2013 | Maroon | H02M 7/003 | 363/125 |
| 9,089,021 | B2 * | 7/2015 | Suh | H05B 45/37 | |
| 10,285,240 | B2 * | 5/2019 | Koo | H05B 47/24 | |
| 10,517,156 | B1 * | 12/2019 | Qiu | H05B 45/325 | |
| 10,757,775 | B2 * | 8/2020 | Modepalli | H05B 45/24 | |
| 11,849,517 | B1 * | 12/2023 | Mignoli | H05B 45/44 | |
| 11,895,748 | B2 * | 2/2024 | Song | H05B 45/10 | |
| 12,471,192 | B2 * | 11/2025 | Lee | H05B 45/28 | |
| 2004/0183513 | A1 * | 9/2004 | Vinciarelli | H02M 3/33571 | 323/284 |
| 2005/0030264 | A1 * | 2/2005 | Tsuge | G09G 3/3283 | 345/76 |
| 2005/0286271 | A1 * | 12/2005 | Vinciarelli | H02J 1/102 | 363/17 |
| 2006/0273331 | A1 * | 12/2006 | Lim | H05B 45/20 | 257/80 |
| 2008/0088258 | A1 * | 4/2008 | Ng | H05B 47/18 | 315/294 |
| 2009/0248344 | A1 * | 10/2009 | Hirabayashi | G09G 3/3648 | 315/307 |
| 2009/0278663 | A1 * | 11/2009 | Takeda | G06K 17/00 | 340/10.1 |
| 2010/0171442 | A1 * | 7/2010 | Draper | H05B 45/20 | 315/297 |
| 2011/0211378 | A1 * | 9/2011 | Maroon | H02M 7/003 | 363/125 |
| 2011/0260633 | A1 * | 10/2011 | Takeda | H05B 45/39 | 315/192 |
| 2012/0153930 | A1 * | 6/2012 | Goto | H03K 17/725 | 323/311 |
| 2014/0035475 | A1 * | 2/2014 | Suh | H05B 45/14 | 315/200 R |
| 2014/0210361 | A1 * | 7/2014 | Ferrier | H05B 45/28 | 315/186 |
| 2014/0247590 | A1 * | 9/2014 | Wilcox | F21V 29/83 | 362/230 |
| 2014/0361695 | A1 * | 12/2014 | Akiyama | H05B 47/185 | 315/185 R |
| 2015/0257230 | A1 * | 9/2015 | Lee | H05B 47/19 | 315/186 |
| 2015/0365003 | A1 * | 12/2015 | Sadwick | H02M 3/28 | 363/21.01 |
| 2016/0255691 | A1 * | 9/2016 | Yu | H05B 45/46 | 315/193 |
| 2016/0295655 | A1 * | 10/2016 | Guo | H05B 45/44 | |
| 2017/0048935 | A1 * | 2/2017 | Koo | H05B 47/24 | |
| 2017/0188420 | A1 * | 6/2017 | Kido | H05B 47/24 | |
| 2024/0206034 | A1 * | 6/2024 | Patukuri | H05B 45/347 | |
| 2024/0215126 | A1 * | 6/2024 | Miskin | H05B 45/10 | |
| 2024/0244726 | A1 * | 7/2024 | Lee | H05B 45/395 | |

OTHER PUBLICATIONS

Maxim, "Maxim 24-Output PWM LED Drivers for Message Boards," MAX6974/MAX6972, 19-05555; Rev 2; Oct. 2007, 23 pages.

TT Electronics, "Full Color PLCC6 LED OVSTRGBB1CR8," https://www.ttelectronics.com/TTElectronics/media/ProductFiles/Datasheet/OVSTRGBB1CR8.pdf, Rev. B, Aug. 2017, 5 pages.

* cited by examiner

OPTIMIZED POWER MANAGEMENT IN RGB DRIVERS WITH MULTIPLEXING

TECHNICAL FIELD

The present disclosure relates generally to a system and method power management, and, in particular embodiments, to a system and method for optimizing power management in RGB drivers with multiplexing.

BACKGROUND

RGB drivers are configured to drive RGB circuits that include a plurality of light-emitting diodes (LEDs). Generally, LEDs of different colors (e.g., red, green, and blue) have different terminal voltages. The voltage mismatch between LEDs may be a cause power loss within RGB drivers.

SUMMARY

In accordance with an embodiment, a driving circuit includes a measurement circuit including a plurality of sensing terminals. A first sensing terminal of the measurement circuit is configured to be coupled to a first terminal of a first dissipative circuit element and a first terminal of a first light-emitting diode (LED). The first LED has a first terminal voltage. A second sensing terminal of the measurement circuit is configured to be coupled to a second terminal of the first dissipative circuit element and a first terminal of a second LED. The second LED has a second terminal voltage less than the first terminal voltage. A third sensing terminal of the measurement circuit is configured to be coupled to a second terminal of the first LED. A fourth sensing terminal of the measurement circuit is configured to be coupled to a second terminal of the second LED.

In accordance with an embodiment, a circuit includes a driving circuit. The driving circuit includes a plurality of switches, a plurality of current sources, and a measuring circuit comprising a plurality of sensing terminals. The circuit further includes a first dissipative circuit element coupled between a first switch of the plurality of switches and a first sensing terminal of the measuring circuit. The circuit further includes a first light-emitting diode (LED) coupled between the first sensing terminal and a second sensing terminal of the measuring circuit, wherein the first LED has a first terminal voltage. The second sensing terminal of the measuring circuit is coupled to a first current source of the plurality of current sources. The circuit further includes a second LED coupled between the first switch and a third sensing terminal of the measuring circuit. The second LED has a second terminal voltage greater the first terminal voltage. The third sensing terminal of the measuring circuit is coupled to a second current source of the plurality of current sources. The circuit further includes a third LED coupled between a fourth sensing terminal and a fifth sensing terminal of the measuring circuit. The third LED has a third terminal voltage greater the first terminal voltage. The fifth sensing terminal of the measuring circuit is coupled to a third current source of the plurality of current sources.

In accordance with an embodiment, a method of operating a circuit including a measuring circuit, a first light-emitting diode (LED) coupled between a first sensing terminal and a second sensing terminal of the measuring circuit, a second LED coupled between the first sensing terminal and a third sensing terminal of the measuring circuit, and a first dissipative circuit element coupled in series with the first LED between the first sensing terminal and the second sensing terminal of the measuring circuit, a terminal between the first dissipative circuit element and the first LED being coupled to a fourth sensing terminal of the measuring circuit, where the second LED has a greater terminal voltage than the first LED, the method includes measuring a voltage drop across the first LED using the second sensing terminal and the fourth sensing terminal of the measuring circuit, determining a temperature of the first LED based on the measured voltage drop across the first LED, and calibrating a color of the first LED by adjusting a current through the first LED based on the determined temperature of the first LED.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The present disclosure describes a system and method for optimizing power management in RGB drivers that are configured to drive RGB circuits comprising a plurality of light-emitting diode (LEDs). The LEDs may have different terminal voltages that may cause power loss within the RGB drivers. In some embodiments, a dissipation circuit element may be coupled in series with an LED having a smallest terminal voltage to compensate voltage mismatch between LEDs. By including the dissipation circuit element, the voltage that would otherwise drop within the RGB driver, is dropped across the dissipation circuit element. Consequently, power dissipation within the RGB driver may be reduced. In some embodiments, an additional sense terminal included with each dissipation circuit element, which allows accurate measurements of voltage drops across LEDs. By accurately measuring the voltage drops, the temperatures of the LEDs may be accurately determined, and may be used to calibrate color of LEDs. Various embodiments may be applied both to simplex and multiplex applications.

Figure 1:
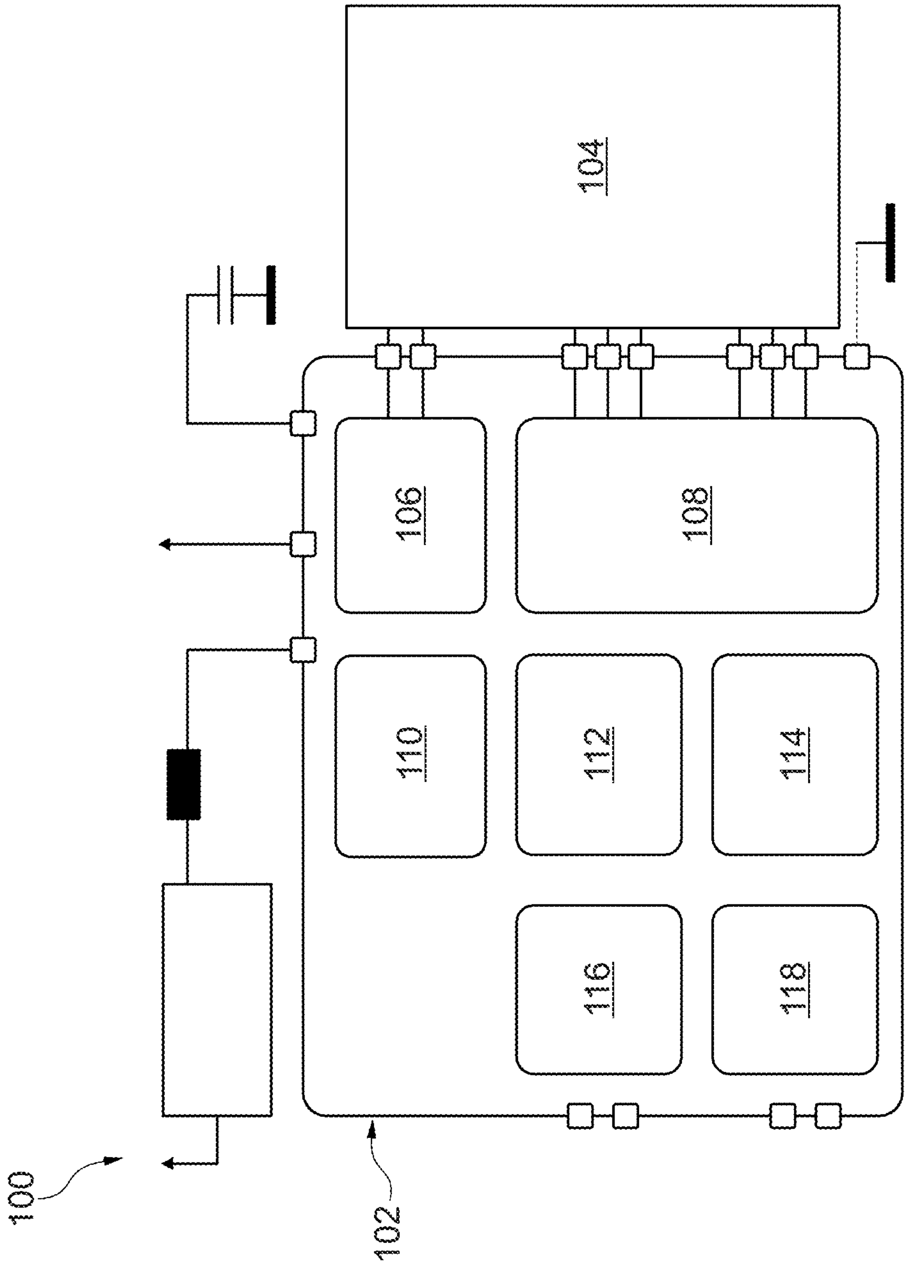
FIG. 1 illustrates a schematic view of a circuit comprising a driver circuit coupled to an RGB circuit, in accordance to some embodiments.

FIG. 1 illustrates a schematic view of a circuit 100 comprising a driver circuit 102 coupled to an RGB circuit 104, in accordance to some embodiments. The driver circuit 102 may be configured to provide desired currents and voltages to various light-emitting diodes (LEDs) of the RGB circuit 104. The driver circuit 102 may be configured to measure voltages across the LEDs of the RGB circuit 104 and calibrate the LEDs based on the measured voltages.

The driver circuit 102 comprises a plurality of switches 106 that are configured to provide multiplexing capability to the driver circuit 102. The plurality of switches 106 may be high-speed switches. The plurality of switches 106 may be implemented by NMOS transistors, PMOS transistors, or the like. The driver circuit 102 further comprises a measurement circuit 108. The measurement circuit 108 may be configured to measure voltages across the LEDs of the RGB circuit 104. In some embodiments, the measurement circuit 108 may be implemented using an analog-to-digital converter (ADC). In other embodiments, the measurement circuit 108 may be implemented using an analog circuit comprising a differential amplifier. In some embodiments, the measurement circuit 108 may further comprise a current sink including one or more current sources.

The driver circuit 102 may further comprise a controller 112. The controller 112 may be a microprocessor, an application-specific integrated circuit (ASIC), or the like. The controller 112 may be configured to provide control signals to various components of the driver circuit 102. In some embodiments, the controller 112 may determine temperatures of the LEDs of the RGB circuit 104 based on the measured voltages, and based on the determined temperatures, sends signals to the measurement circuit 108 to provide desired currents to the LEDs.

The driver circuit 102 may further comprise pulse width modulator (PWM) 110, a protocol handler module 114, a general-purpose input/output (GPIO) module 116, and a high-speed serial interface (HSLI) transceiver 118.

Figure 2:
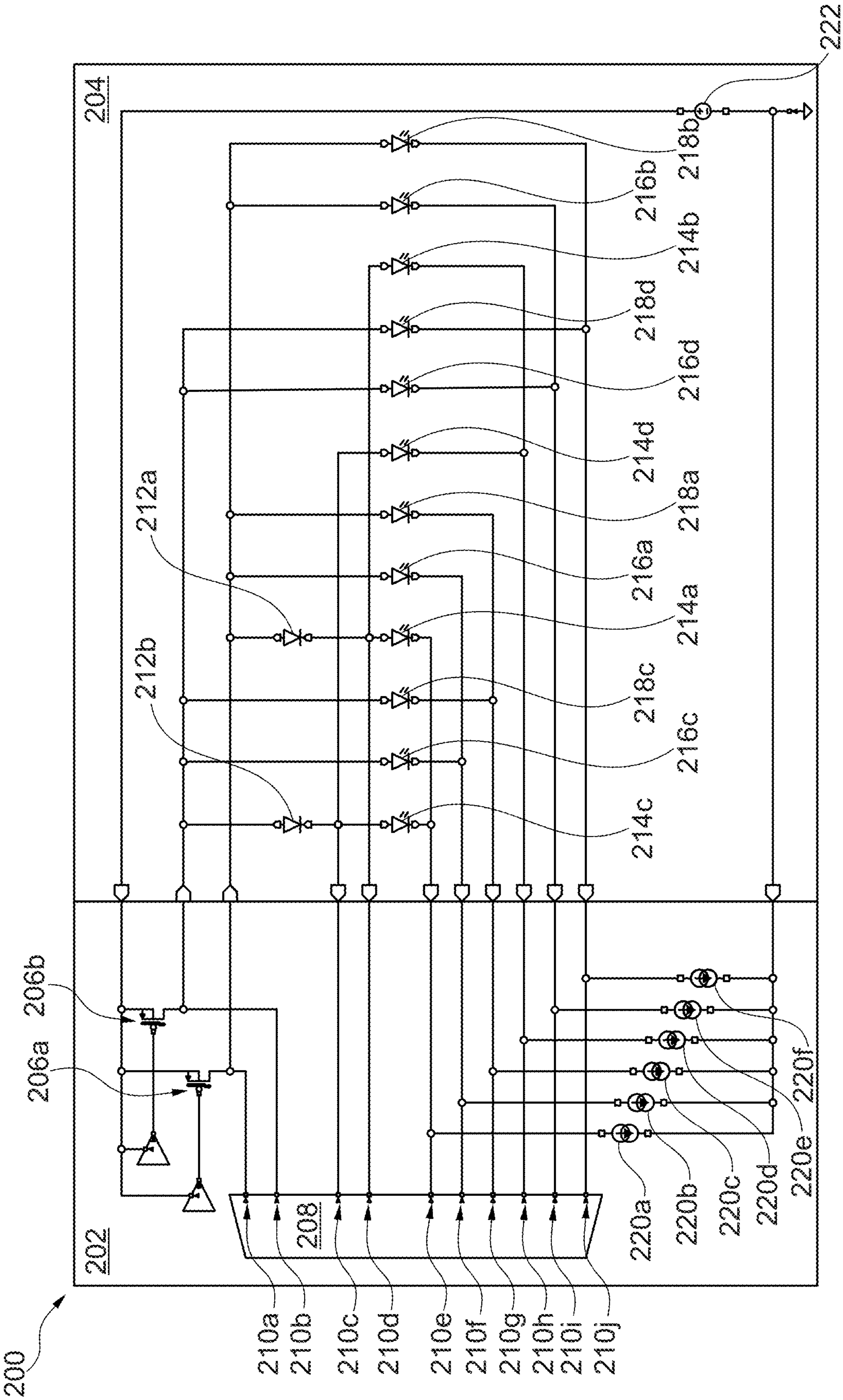
FIG. 2 illustrates a schematic view of a circuit comprising a driver circuit coupled to an RGB circuit, in accordance to some embodiments.

FIG. 2 illustrates a schematic view of a circuit 200 comprising a driver circuit 202 coupled to an RGB circuit 204, in accordance to some embodiments. In some embodiments, the driver circuit 202 may be similar to the driver circuit 102 (see FIG. 1) and the description is not repeated herein. For clarity of the presentation, only the switches (e.g., switches 206*a* and 206*b*) and the measurement circuit 208 of the driver circuit 202 are illustrated. The RGB circuit 204 comprises a plurality of red LEDs (e.g., red LEDs 214*a*-214*d*), a plurality of green LEDs (e.g., green LEDs 216*a*-216*d*), and a plurality of blue LEDs (e.g., blue LEDs 218*a*-218*d*). In some embodiments, a terminal voltage of a red LED is less than a terminal voltage of a green LED, and the terminal voltage of the green LED is less than a terminal voltage of a blue LED. In other embodiments, the terminal voltage of the red LED is less than the terminal voltage of the blue LED, and the terminal voltage of the blue LED is less than the terminal voltage of the green LED.

The measurement circuit 208 may comprise a plurality of terminals (e.g., terminals 210*a*-210*j*). The terminals may be also referred to sensing terminals. A first terminal 210*a* of the measurement circuit 208 is coupled to a first terminal of the first switch 206*a*, a first terminal of a first dissipative circuit element 212*a*, a first terminal of a first green LED 216*a*, a first terminal of a first blue LED 218*a*, a first terminal of a second green LED 216*b*, a first terminal of a second blue LED 218*b*. A second terminal 210*b* of the measurement circuit 108 is coupled to a first terminal of the second switch 206*b*, a first terminal of a second dissipative circuit element 212*b*, a first terminal of a third green LED 216*c*, a first terminal of a third blue LED 218*c*, a first terminal of a fourth green LED 216*d*, a first terminal of a fourth blue LED 218*d*.

A third terminal 210*c* of the measurement circuit 208 is coupled to a second terminal of the second dissipative circuit element 212*b*, a first terminal of the third red LED 214*c*, and a first terminal of the fourth red LED 214*d*. A fourth terminal 210*d* of the measurement circuit 208 is coupled to a second terminal of the first dissipative circuit element 212*a*, a first terminal of the first red LED 214*a*, and a first terminal of the second red LED 214*b*.

A fifth terminal 210*e* of the measurement circuit 208 is coupled to a second terminal of the first red LED 214*a*, a second terminal of the third red LED 214*c*, and a first terminal of a first current source 220*a*. A sixth terminal 210*f* of the measurement circuit 208 is coupled to a second terminal of the first green LED 216*a*, a second terminal of the third green LED 216*c*, and a first terminal of a second current source 220*b*.

A seventh terminal 210*g* of the measurement circuit 208 is coupled to a second terminal of the first blue LED 218*a*, a second terminal of the third blue LED 218*c*, and a first terminal of a third current source 220*c*. An eighth terminal 210*h* of the measurement circuit 208 is coupled to a second terminal of the second red LED 214*b*, a second terminal of the fourth red LED 214*d*, and a first terminal of a fourth current source 220*d*.

A ninth terminal 210*i* of the measurement circuit 108 2 s coupled to a second terminal of the second green LED 216*b*, a second terminal of the fourth green LED 216*d*, and a first terminal of a fifth current source 220*e*. A tenth terminal 210*j* of the measurement circuit 208 is coupled to a second terminal of the second blue LED 218*b*, a second terminal of the fourth blue LED 218*d*, and a first terminal of a sixth current source 220*f*.

A second terminal of the first switch 206*a* and a second terminal of the second switch 206*b* are coupled to a first terminal of a voltage source 222. A second terminal of the voltage source 222 is coupled to ground. A second terminal of the first current source 220*a*, a second terminal of the second current source 220*b*, a second terminal of the third current source 220*c*, a second terminal of the fourth current source 220*d*, a second terminal of the fifth current source 220*e*, and a second terminal of the sixth current source 220*f* are coupled to ground.

By including the dissipative circuit elements 212*a* and 212*b*, excess voltages are dropped across the dissipative circuit element 212*a* and 212*b* instead of within the driver circuit 102, which reduces power consumption of the driver circuit 102. In the illustrated embodiment, the first dissipative circuit element 212*a* and the second dissipative circuit element 212*b* comprise diodes. In other embodiments, each of the first dissipative circuit element 212*a* and the second dissipative circuit element 212*b* may comprise a resistor, or other dissipative circuits.

The measurement circuit 208 may be configured to measure a voltage across the first red LED 214*a* by measuring a voltage between the fourth terminal 210*d* and the fifth terminal 210*e* of the measurement circuit 208. The measurement circuit 208 may be configured to measure a voltage across the second red LED 214*b* by measuring a voltage between the fourth terminal 210*d* and the eighth terminal 210*h* of the measurement circuit 208. The measurement circuit 208 may be configured to measure a voltage across the third red LED 214*c* by measuring a voltage between the third terminal 210*c* and the fifth terminal 210*e* of the measurement circuit 208. The measurement circuit 208 may be configured to measure a voltage across the fourth red LED 214*d* by measuring a voltage between the third terminal 210*c* and the eighth terminal 210*h* of the measurement circuit 208.

The measurement circuit 208 may be configured to measure a voltage across the first green LED 216*a* by measuring a voltage between the first terminal 210*a* and the sixth terminal 210*f* of the measurement circuit 208. The measurement circuit 208 may be configured to measure a voltage across the second green LED 216*b* by measuring a voltage between the first terminal 210*a* and the ninth terminal 210*i* of the measurement circuit 208. The measurement circuit 208 may be configured to measure a voltage across the third green LED 216*c* by measuring a voltage between the second terminal 210*b* and the sixth terminal 210*f* of the measurement circuit 208. The measurement circuit 208 may be configured to measure a voltage across the fourth green LED 216*d* by measuring a voltage between the second terminal 210*b* and the ninth terminal 210*i* of the measurement circuit 208.

The measurement circuit 208 may be configured to measure a voltage across the first blue LED 218*a* by measuring a voltage between the first terminal 210*a* and the seventh terminal 210*g* of the measurement circuit 208. The measurement circuit 208 may be configured to measure a voltage across the second blue LED 218*b* by measuring a voltage between the first terminal 210*a* and the tenth terminal 210*j* of the measurement circuit 208. The measurement circuit 208 may be configured to measure a voltage across the third blue LED 218*c* by measuring a voltage between the second terminal 210*b* and the seventh terminal 210*g* of the measurement circuit 208. The measurement circuit 208 may be configured to measure a voltage across the fourth blue LED 218*d* by measuring a voltage between the second terminal 210*b* and the tenth terminal 210*j* of the measurement circuit 208.

Figure 3:
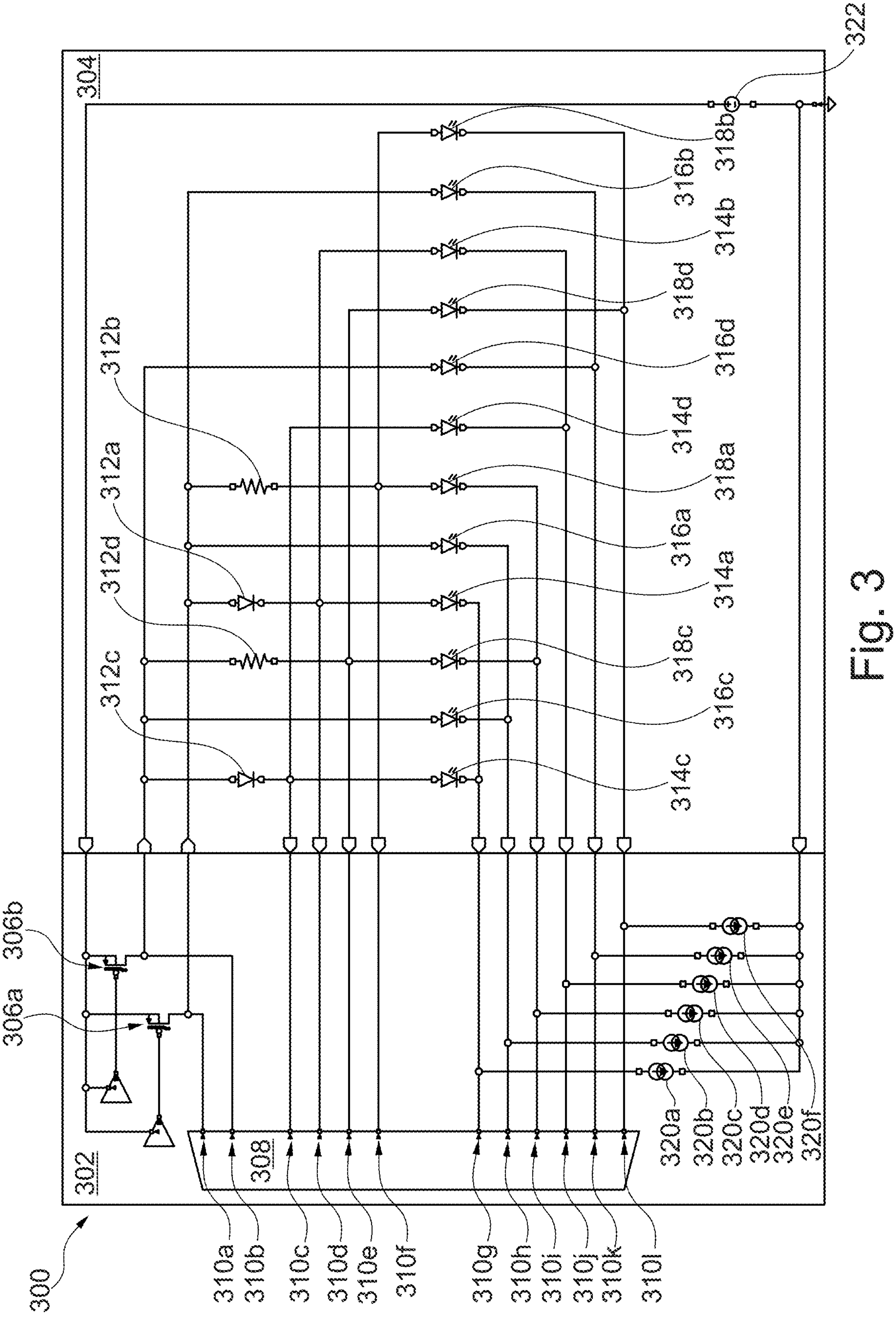
FIG. 3 illustrates a schematic view of a circuit comprising a driver circuit coupled to an RGB circuit, in accordance to some embodiments.

FIG. 3 illustrates a schematic view of a circuit 300 comprising a driver circuit 302 coupled to an RGB circuit 304, in accordance to some embodiments. In some embodiments, the driver circuit 302 may be similar to the driver circuit 102 (see FIG. 1) and the description is not repeated herein. For clarity of the presentation, only the switches (e.g., switches 306*a* and 306*b*) and the measurement circuit 308 of the driver circuit 302 are illustrated. The RGB circuit 304 comprises a plurality of red LEDs (e.g., red LEDs 314*a*-314*d*), a plurality of green LEDs (e.g., green LEDs 316*a*-316*d*), and a plurality of blue LEDs (e.g., blue LEDs 318*a*-318*d*). In the illustrated embodiment, the terminal voltage of the red LED is less than the terminal voltage of the blue LED, and the terminal voltage of the blue LED is less than the terminal voltage of the green LED.

The measurement circuit 308 may comprise a plurality of terminals (e.g., terminals 310*a*-310*l*). The terminals may be also referred to sensing terminals. A first terminal 310*a* of the measurement circuit 308 is coupled to a first terminal of the first switch 306*a*, a first terminal of a first dissipative circuit element 312*a*, a first terminal of a first green LED 316*a*, a first terminal of a second dissipative circuit element 312*b*, and a first terminal of a second green LED 316*b*. A second terminal 310*b* of the measurement circuit 108 is coupled to a first terminal of the second switch 306*b*, a first terminal of a third dissipative circuit element 312*c*, a first terminal of a third green LED 316*c*, a first terminal of a fourth dissipative circuit element 312*d*, and a first terminal of a fourth green LED 316*d*.

A third terminal 310*c* of the measurement circuit 208 is coupled to a second terminal of the third dissipative circuit element 312*c*, a first terminal of the third red LED 314*c*, and a first terminal of the fourth red LED 314*d*. A fourth terminal 310*d* of the measurement circuit 308 is coupled to a second terminal of the first dissipative circuit element 312*a*, a first terminal of the first red LED 314*a*, and a first terminal of the second red LED 314*b*.

A fifth terminal 310*e* of the measurement circuit 308 is coupled to a second terminal of the fourth dissipative circuit element 312*d*, a first terminal of the third blue LED 318*c*, and a first terminal of the fourth blue LED 318*d*. A sixth terminal 310*f* of the measurement circuit 308 is coupled to a second terminal of the second dissipative circuit element 312*b*, a first terminal of the first blue LED 318*a*, and a first terminal of the second blue LED 318*b*.

A seventh terminal 310*g* of the measurement circuit 308 is coupled to a first terminal of a first current source 320*a*, a second terminal of the first red LED 314*a*, and a second terminal of the third red LED 314*c*. An eighth terminal 310*h* of the measurement circuit 308 is coupled to a first terminal of a second current source 320*b*, a second terminal of the first green LED 316*a*, and a second terminal of the third green LED 316*c*.

A ninth terminal 310*i* of the measurement circuit 308 is coupled to a first terminal of a third current source 320*c*, a second terminal of the first blue LED 318*a*, and a second terminal of the third blue LED 318*c*. A tenth terminal 310*j* of the measurement circuit 308 is coupled to a first terminal of a fourth current source 320*d*, a second terminal of the second red LED 314*b*, and a second terminal of the fourth red LED 314*d*.

An eleventh terminal 310*k* of the measurement circuit 308 is coupled to a first terminal of a fifth current source 320*e*, a second terminal of the second green LED 316*b*, and a second terminal of the fourth green LED 316*d*. A twelfth terminal 310*l* of the measurement circuit 308 is coupled to a first terminal of a sixth current source 320*f*, a second terminal of the second blue LED 318*b*, and a second terminal of the fourth blue LED 318*d*.

A second terminal of the first switch 306*a* and a second terminal of the second switch 306*b* are coupled to a first terminal of a voltage source 322. A second terminal of the voltage source 322 is coupled to ground. A second terminal of the first current source 320*a*, a second terminal of the second current source 320*b*, a second terminal of the third current source 320*c*, a second terminal of the fourth current source 320*d*, a second terminal of the fifth current source 320*e*, and a second terminal of the sixth current source 320*f* are coupled to ground.

By including the dissipative circuit elements 312*a*-312*d*, excess voltages are dropped across the dissipative circuit elements 312*a*-312*d* instead of within the driver circuit 302, which reduces power consumption of the driver circuit 302. In the illustrated embodiments, the first dissipative circuit element 312*a* and the third dissipative circuit element 312*c* comprise diodes, and the second dissipative circuit element 312*b* and the fourth dissipative circuit element 312*d* comprise resistors. In other embodiments, each of the dissipative circuit elements 312*a*-312*d* may comprise a diode, a resistor, or other dissipative circuits.

The measurement circuit 308 may be configured to measure a voltage across the first red LED 314*a* by measuring a voltage between the fourth terminal 310*d* and the seventh terminal 210*g* of the measurement circuit 308. The measurement circuit 308 may be configured to measure a voltage across the second red LED 314*b* by measuring a voltage between the fourth terminal 310*d* and the tenth terminal 310*j* of the measurement circuit 308. The measurement circuit 308 may be configured to measure a voltage across the third red LED 314*c* by measuring a voltage between the third terminal 310*c* and the seventh terminal 310*g* of the measurement circuit 308. The measurement circuit 308 may be configured to measure a voltage across the fourth red LED 314*d* by measuring a voltage between the third terminal 310*c* and the tenth terminal 310*j* of the measurement circuit 308.

The measurement circuit 308 may be configured to measure a voltage across the first green LED 316*a* by measuring a voltage between the first terminal 310*a* and the eighth terminal 310*h* of the measurement circuit 308. The measurement circuit 308 may be configured to measure a voltage across the second green LED 316*b* by measuring a voltage between the first terminal 310*a* and the eleventh terminal 310*k* of the measurement circuit 308. The measurement circuit 308 may be configured to measure a voltage across the third green LED 316*c* by measuring a voltage between the second terminal 310*b* and the eighth terminal 310*h* of the measurement circuit 308. The measurement circuit 308 may be configured to measure a voltage across the fourth green LED 316*d* by measuring a voltage between the second terminal 310*b* and the eleventh terminal 210*k* of the measurement circuit 308.

The measurement circuit 308 may be configured to measure a voltage across the first blue LED 318*a* by measuring a voltage between the sixth terminal 310*f* and the ninth terminal 310*i* of the measurement circuit 308. The measurement circuit 308 may be configured to measure a voltage across the second blue LED 318*b* by measuring a voltage between the sixth terminal 310*f* and the twelfth terminal 310*l* of the measurement circuit 308. The measurement circuit 308 may be configured to measure a voltage across the third blue LED 318*c* by measuring a voltage between the fifth terminal 310*e* and the ninth terminal 310*i* of the measurement circuit 308. The measurement circuit 308 may be configured to measure a voltage across the fourth blue LED 318*d* by measuring a voltage between the fifth terminal 310*e* and the twelfth terminal 310*l* of the measurement circuit 308.

Figure 4:
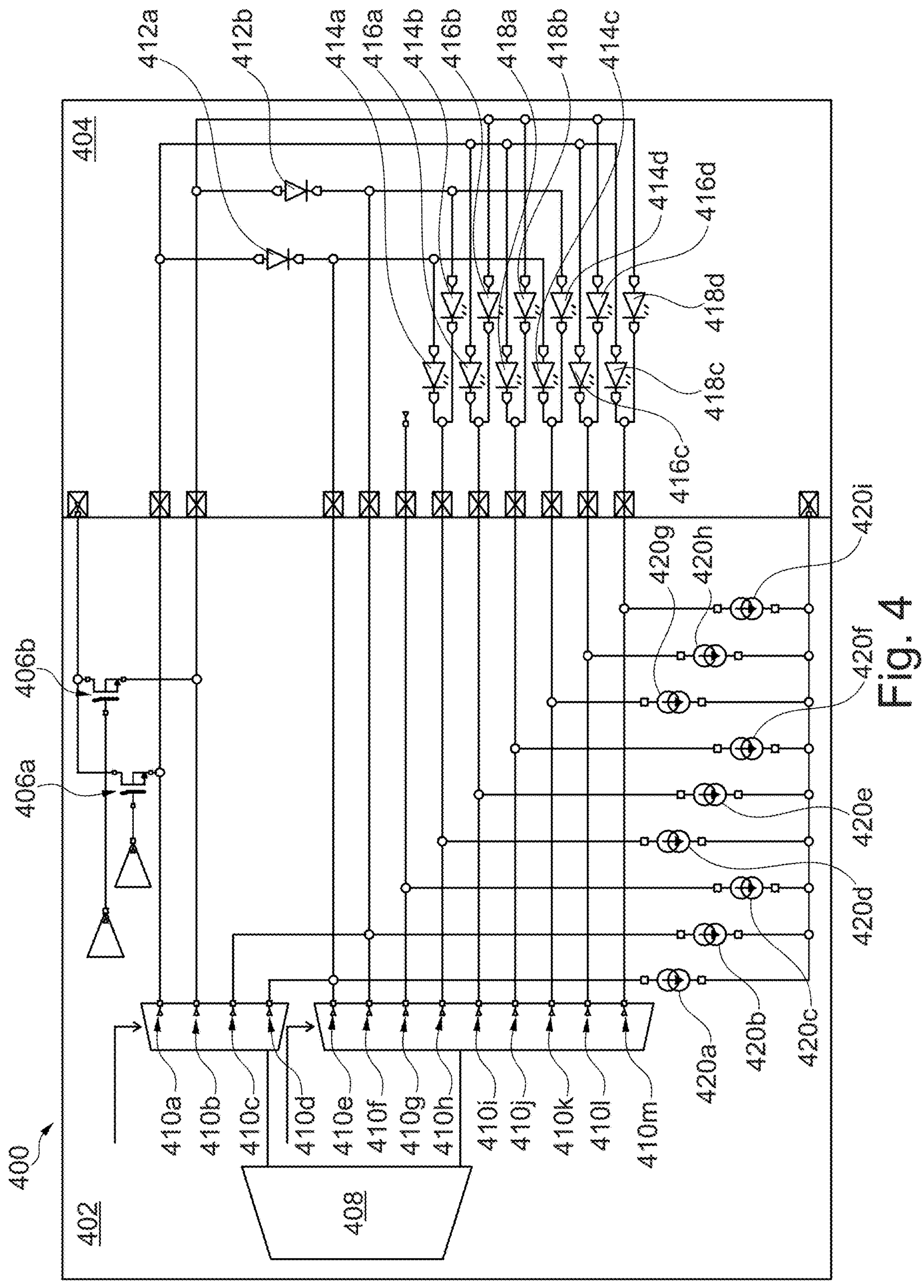
FIG. 4 illustrates a schematic view of a circuit comprising a driver circuit coupled to an RGB circuit, in accordance to some embodiments.

FIG. 4 illustrates a schematic view of a circuit 400 comprising a driver circuit 402 coupled to an RGB circuit 404, in accordance to some embodiments. In some embodiments, the driver circuit 402 may be similar to the driver circuit 102 (see FIG. 1) and the description is not repeated herein. For clarity of the presentation, only the switches (e.g., switches 406*a* and 406*b*) and the measurement circuit 408 of the driver circuit 402 are illustrated. The RGB circuit 404 comprises a plurality of red LEDs (e.g., red LEDs 414*a*-414*d*), a plurality of green LEDs (e.g., green LEDs 416*a*-416*d*), and a plurality of blue LEDs (e.g., blue LEDs 418*a*-418*d*). In some embodiments, a terminal voltage of a red LED is less than a terminal voltage of a green LED, and the terminal voltage of the green LED is less than a terminal voltage of a blue LED. In other embodiments, the terminal voltage of the red LED is less than the terminal voltage of the blue LED, and the terminal voltage of the blue LED is less than the terminal voltage of the green LED.

The measurement circuit 408 may comprise a plurality of terminals (e.g., terminals 410*a*-410*m*). The terminals may be also referred to sensing terminals. In the illustrated embodiments, the terminals 410*a*-410*d* are positive terminals and the terminals 410*e*-410*m* are negative terminals. A first terminal 410*a* of the measurement circuit 408 is coupled to a first terminal of the first switch 406*a*, a first terminal of a first dissipative circuit element 412*a*, a first terminal of a first green LED 416*a*, a first terminal of a first blue LED 418*a*, a first terminal of a third green LED 416*c*, a first terminal of a third blue LED 418*c*. A second terminal 410*b* of the measurement circuit 408 is coupled to a first terminal of the second switch 406*b*, a first terminal of a second dissipative circuit element 412*b*, a first terminal of a second green LED 416*b*, a first terminal of a second blue LED 418*b*, a first terminal of a fourth green LED 416*d*, a first terminal of a fourth blue LED 418*d*.

A third terminal 410*c* of the measurement circuit 408 is coupled to a first terminal of a second current source 420*b*, a second terminal of the second dissipative circuit element 412*b*, a first terminal of the second red LED 414*b*, and a first terminal of the fourth red LED 414*d*. A fourth terminal 410*d* of the measurement circuit 408 is coupled to a first terminal of a first current source 420*a*, a second terminal of the first dissipative circuit element 412*a*, a first terminal of the first red LED 414*a*, and a first terminal of the third red LED 214*c*.

A fifth terminal 410*e* of the measurement circuit 408 is coupled to the first terminal of the first current source 420*a*, the second terminal of the first dissipative circuit element 412*a*, the first terminal of the first red LED 414*a*, and the first terminal of the third red LED 414*c*. A sixth terminal 410*f* of the measurement circuit 408 is coupled to the first terminal of the second current source 420*b*, the second terminal of the second dissipative circuit element 412*b*, the first terminal of the second red LED 414*b*, and the first terminal of the fourth red LED 414*d*. A seventh terminal 410*g* of the measurement circuit 408 is coupled to a first terminal of a third current source 420*c*.

An eighth terminal 410*h* of the measurement circuit 408 is coupled to a first terminal of a fourth current source 420*d*, a second terminal of the first red LED 414*a*, and a second terminal of the second red LED 414*b*. A ninth terminal 410*i* of the measurement circuit 408 is coupled to a first terminal of a fifth current source 420*e*, a second terminal of the first green LED 416*a*, and a second terminal of the second green LED 416*b*.

A tenth terminal 410*j* of the measurement circuit 408 is coupled to a first terminal of a sixth current source 420*f*, a second terminal of the first blue LED 418*a*, and a second terminal of the second blue LED 418*b*. An eleventh terminal 410*k* of the measurement circuit 408 is coupled to a first terminal of a seventh current source 420*g*, a second terminal of the third red LED 414*c*, and a second terminal of the fourth red LED 414*d*.

A twelfth terminal 410*l* of the measurement circuit 408 is coupled to a first terminal of an eighth current source 420*l*, a second terminal of the third green LED 416*c*, and a second terminal of the fourth green LED 416*d*. A thirteenth terminal 410*m* of the measurement circuit 408 is coupled to a first terminal of a ninth current source 420*i*, a second terminal of the third blue LED 418*c*, and a second terminal of the fourth blue LED 418*d*.

A second terminal of the first switch 406*a* and a second terminal of the second switch 406*b* are coupled to a voltage source. Second terminals of the current sources 420*a*-420*i* are coupled to ground.

By including the dissipative circuit elements 412*a* and 412*b*, excess voltages are dropped across the dissipative circuit elements 412*a* and 412*b* instead of within the driver circuit 402, which reduces power consumption of the driver circuit 402. In the illustrated embodiments, the first dissipative circuit element 412*a* and the second dissipative circuit element 412*b* comprise diodes. In other embodiments, each of the first dissipative circuit element 412*a* and the second dissipative circuit element 412*b* may comprise a resistor, or other dissipative circuits.

In the illustrated embodiment, the first terminals of the first current source 420*a* and the second current source 420*b* may be used as a sensing terminal while measuring voltage across red LEDs 414*a*-414*d*. In such embodiments, the first terminal of the first current source 420*a* may be mapped to the terminal 410*d* of the measurement circuit 408 and the first terminal of the second current source 420*b* may be mapped to the terminal 410*c* of the measurement circuit 408.

In some embodiments, the circuits 200, 300, and 400 (see FIGS. 2, 3, and 4) allow for reducing power dissipation within the driver circuits 202, 302, and 402, respectively. Saved power (P) may be determined according to a formula $$P = \frac{N}{3} I(\Delta V_{gr} + \Delta V_{gb}),$$

where N depends on the number of driven LEDs, I is a current, $\Delta V_{gr} = V_g - V_r$, $\Delta V_{gb} = V_g - V_b$, $V_g$ is a terminal voltage of green LEDs, $V_r$ is a terminal voltage of red LEDs, $V_b$ is a terminal voltage of blue LEDs.

In an embodiment when I=50 mA, $V_r$=2.3 V, $V_g$=3.3 V, and $V_b$=2.9 V, and 12 LEDs (N=18) are driven and only red LEDs are compensated (see FIGS. 2 and 4), saved power (P) is 0.3 W. In an embodiment when I=50 mA, $V_r$=2.3 V, $V_g$=3.3 V, and $V_b$=2.9 V, and 12 LEDs (N=18) are driven and red and green LEDs are compensated (see FIG. 3), saved power (P) is 0.45 W. In some embodiments, about 15% of power is saved.

Figure 5:
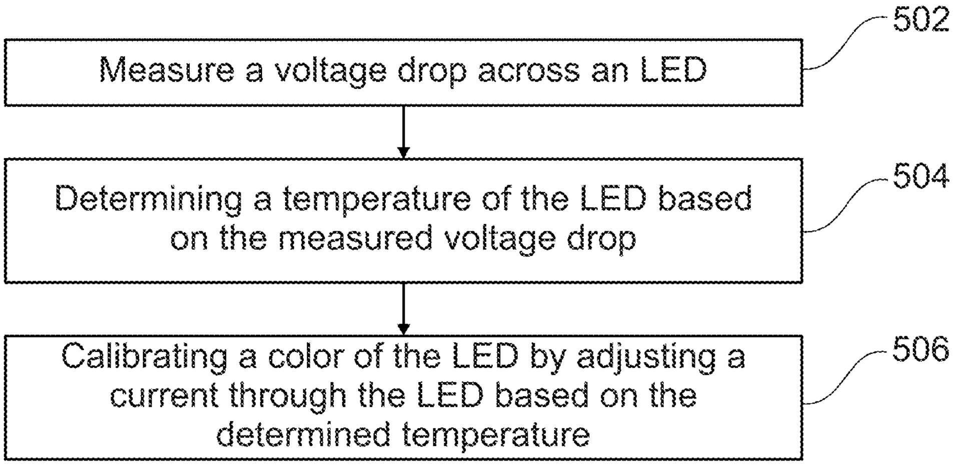
FIG. 5 illustrates a flow diagram of a method for calibrating an RGB circuit, in accordance to some embodiments.

FIG. 5 illustrates a flow diagram of a method 500 for calibrating an RGB circuit, in accordance to some embodiments. The method 500 may be described in conjunction with the circuits 100, 200, 300, and 400 illustrated in FIGS. 1, 2, 3, and 4, respectively. In step 502, a measurement circuit (e.g., measurement circuits 208, 308, or 408) of a driver circuit (e.g., driver circuits 202, 302, or 402) measures a voltage drop across an LED of an RGB circuit (e.g., RGB circuits 204, 304, 404). In step 504, a controller (e.g., controller 112) of the driver circuit determines a temperature of the LED based on the measured voltage drop.

In step 506, the controller of the driver circuit calibrates a color of the LED by adjusting a current through the LED based on the determined temperature. In some embodiments, the controller of the driver circuit sends a signal to the measurement circuit to provide a desired current to the LED.

Example 1. A driving circuit including a measurement circuit including a plurality of sensing terminals. A first sensing terminal of the measurement circuit is configured to be coupled to a first terminal of a first dissipative circuit element and a first terminal of a first light-emitting diode (LED). The first LED has a first terminal voltage. A second sensing terminal of the measurement circuit is configured to be coupled to a second terminal of the first dissipative circuit element and a first terminal of a second LED. The second LED has a second terminal voltage less than the first terminal voltage. A third sensing terminal of the measurement circuit is configured to be coupled to a second terminal of the first LED. A fourth sensing terminal of the measurement circuit is configured to be coupled to a second terminal of the second LED.

Example 2. The driving circuit of example 1, where: the first sensing terminal of the measurement circuit is further configured to be coupled to a first terminal of a second dissipative circuit element; and a fifth sensing terminal of the measurement circuit is configured to be coupled to: a second terminal of the second dissipative circuit element; and the first terminal of the first LED.

Example 3. The driving circuit of example 2, where: the first sensing terminal of the measurement circuit is further configured to be coupled to a first terminal of a third LED, where the third LED has a third terminal voltage greater than the first terminal voltage; and a sixth sensing terminal of the measurement circuit is configured to be coupled to a second terminal of the third LED.

Example 4. The driving circuit of example 3, wherein each of the first dissipative circuit element and the second dissipative circuit element comprises a resistor or a diode.

Example 5. The driving circuit of one of examples 3 and 4, where: a seventh sensing terminal of the measurement circuit is configured to be coupled to: a first terminal of a third dissipative circuit element; and a first terminal of a fourth LED, wherein the fourth LED has the first terminal voltage; a eighth sensing terminal of the measurement circuit is configured to be coupled to: a second terminal of the third dissipative circuit element; and a first terminal of a fifth LED, wherein the fifth LED has the second terminal voltage; the third sensing terminal of the measurement circuit is further configured to be coupled to a second terminal of the fourth LED; and the fourth sensing terminal of the measurement circuit is further configured to be coupled to a second terminal of the fifth LED.

Example 6. The driving circuit of example 5, where: the seventh sensing terminal of the measurement circuit is further configured to be coupled to a first terminal of a fourth dissipative circuit element; and a ninth sensing terminal of the measurement circuit is configured to be coupled to: a second terminal of the fourth dissipative circuit element; and the first terminal of the fourth LED.

Example 7. The driving circuit of example 6, further including a plurality of switches, where: a first terminal of a first switch of the plurality of switches is configured to be coupled to: the first sensing terminal of the measurement circuit; the first terminal of the first dissipation circuit element; the first terminal of the second dissipation circuit element; and the first terminal of the third LED; and a first terminal of a second switch of the plurality of switches is configured to be coupled to: the seventh sensing terminal of the measurement circuit; the first terminal of the third dissipation circuit element; and the first terminal of the fourth dissipation circuit element.

Example 8. The driving circuit of example 7, further including a plurality of current sources, where: a first terminal of a first current source of the plurality of current sources is configured to be coupled to: the second terminal of the measurement circuit; the second terminal of the first dissipation circuit element; and the first terminal of the second LED; and a first terminal of a second current source of the plurality of current sources is configured to be coupled to: the eighth sensing terminal of the measurement circuit; the second terminal of the third dissipation circuit element; and the first terminal of the fifth LED.

Example 9. The driving circuit of one of examples 1 to 8, further including a controller configured to: receive a measured voltage drop across the second LED from the measurement circuit, where the measured voltage drop across the second LED is measured by the measurement circuit using the second sensing terminal and the fourth sensing terminal of the measurement circuit; and adjust a current flowing through the second LED based on the measured voltage drop across the second LED.

Example 10. A circuit including: a driving circuit including: a plurality of switches; a plurality of current sources; and a measuring circuit including a plurality of sensing terminals; a first dissipative circuit element coupled between a first switch of the plurality of switches and a first sensing terminal of the measuring circuit; a first light-emitting diode (LED) coupled between the first sensing terminal and a second sensing terminal of the measuring circuit, where the first LED has a first terminal voltage, and where the second sensing terminal of the measuring circuit is coupled to a first current source of the plurality of current sources; a second LED coupled between the first switch and a third sensing terminal of the measuring circuit, where the second LED has a second terminal voltage greater the first terminal voltage, and where the third sensing terminal of the measuring circuit is coupled to a second current source of the plurality of current sources; and a third LED coupled between a fourth sensing terminal and a fifth sensing terminal of the measuring circuit, where the third LED has a third terminal voltage greater the first terminal voltage, and where the fifth sensing terminal of the measuring circuit is coupled to a third current source of the plurality of current sources.

Example 11. The circuit of example 10, further including a second dissipative circuit element coupled between the first switch and the fourth sensing terminal of the measuring circuit.

Example 12. The circuit of example 11, further including: a third dissipative circuit element coupled between a second switch of the plurality of switches and a sixth sensing terminal of the measuring circuit; a fourth LED coupled between the sixth sensing terminal and the second sensing terminal of the measuring circuit, where the fourth LED has the first terminal voltage; a fifth LED coupled between the second switch and the third sensing terminal of the measuring circuit, where the fifth LED has the first terminal voltage; and a sixth LED coupled between a seventh sensing terminal and the fifth sensing terminal of the measuring circuit, where the sixth LED has the first terminal voltage.

Example 13. The circuit of example 12, further including a fourth dissipative circuit element coupled between the second switch and the seventh sensing terminal of the measuring circuit.

Example 14. The circuit of example 13, where each of the first dissipative circuit element, the second dissipative circuit element, the third dissipative circuit element, and the fourth dissipative circuit element includes a resistor or a diode.

Example 15. The circuit of one of examples 13 and 14, where: the first dissipative circuit element includes a first diode; the second dissipative circuit element includes a second diode; the third dissipative circuit element includes a first resistor; and the fourth dissipative circuit element includes a second resistor.

Example 16. The circuit of one of examples 10 to 15, further including a controller configured to: receive a measured voltage drop across the first LED from the measurement circuit, where the measured voltage drop across the first LED is measured by the measurement circuit using the first sensing terminal and the second sensing terminal of the measurement circuit; and adjust a current flowing through the first LED based on the measured voltage drop across the first LED.

Example 17. The circuit of one of examples 10 to 16, where the measurement circuit comprises an analog-to-digital converter (ADC).

Example 18. A method of operating a circuit including a measuring circuit, a first light-emitting diode (LED) coupled between a first sensing terminal and a second sensing terminal of the measuring circuit, a second LED coupled between the first sensing terminal and a third sensing terminal of the measuring circuit, and a first dissipative circuit element coupled in series with the first LED between the first sensing terminal and the second sensing terminal of the measuring circuit, a terminal between the first dissipative circuit element and the first LED being coupled to a fourth sensing terminal of the measuring circuit, where the second LED has a greater terminal voltage than the first LED, the method including: measuring a voltage drop across the first LED using the second sensing terminal and the fourth sensing terminal of the measuring circuit; determining a temperature of the first LED based on the measured voltage drop across the first LED; and calibrating a color of the first LED by adjusting a current through the first LED based on the determined temperature of the first LED.

Example 19. The method of example 18, further including: measuring a voltage drop across the second LED using the first sensing terminal and the third sensing terminal of the measuring circuit; determining a temperature of the second LED based on the measured voltage drop across the second LED; and calibrating a color of the second LED by adjusting a current through the second LED based on the determined temperature of the second LED.

Example 20. The method of one of examples 18 and 19, where the temperature of the first LED is determined by a controller coupled to the measuring circuit.

Example 21. The method of one of examples 18 to 20, where the current through the first LED is adjusted by a current source coupled to the first LED.

Example 22. The method of one of examples 18 to 21, where: the circuit further comprises a plurality of switches, a third LED, and a fourth LED; and the method further includes: multiplexing the first LED and the third LED using the plurality of switches; and multiplexing the second LED and the fourth LED using the plurality of switches.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A driving circuit comprising:
- a measurement circuit comprising a plurality of sensing terminals, wherein:
  - a first sensing terminal of the measurement circuit is configured to be coupled to:
    - a first terminal of a first dissipative circuit element; and
    - a first terminal of a first light-emitting diode (LED), wherein the first LED has a first terminal voltage;
  - a second sensing terminal of the measurement circuit is configured to be coupled to:
    - a second terminal of the first dissipative circuit element; and
    - a first terminal of a second LED, wherein the second LED has a second terminal voltage less than the first terminal voltage;
  - a third sensing terminal of the measurement circuit is configured to be coupled to a second terminal of the first LED; and
  - a fourth sensing terminal of the measurement circuit is configured to be coupled to a second terminal of the second LED.

2. The driving circuit of claim 1, wherein:
- the first sensing terminal of the measurement circuit is further configured to be coupled to a first terminal of a second dissipative circuit element; and
- a fifth sensing terminal of the measurement circuit is configured to be coupled to:
  - a second terminal of the second dissipative circuit element; and
  - the first terminal of the first LED.

3. The driving circuit of claim 2, wherein:

the first sensing terminal of the measurement circuit is further configured to be coupled to a first terminal of a third LED, wherein the third LED has a third terminal voltage greater than the first terminal voltage; and a sixth sensing terminal of the measurement circuit is configured to be coupled to a second terminal of the third LED.

4. The driving circuit of claim 3, wherein each of the first dissipative circuit element and the second dissipative circuit element comprises a resistor or a diode.

5. The driving circuit of claim 3, wherein:

a seventh sensing terminal of the measurement circuit is configured to be coupled to:

a first terminal of a third dissipative circuit element; and a first terminal of a fourth LED, wherein the fourth LED has the first terminal voltage;

a eighth sensing terminal of the measurement circuit is configured to be coupled to:

a second terminal of the third dissipative circuit element; and a first terminal of a fifth LED, wherein the fifth LED has the second terminal voltage;

the third sensing terminal of the measurement circuit is further configured to be coupled to a second terminal of the fourth LED; and the fourth sensing terminal of the measurement circuit is further configured to be coupled to a second terminal of the fifth LED.

6. The driving circuit of claim 5, wherein:

the seventh sensing terminal of the measurement circuit is further configured to be coupled to a first terminal of a fourth dissipative circuit element; and a ninth sensing terminal of the measurement circuit is configured to be coupled to:

a second terminal of the fourth dissipative circuit element; and the first terminal of the fourth LED.

7. The driving circuit of claim 6, further comprising a plurality of switches, wherein:

a first terminal of a first switch of the plurality of switches is configured to be coupled to:

the first sensing terminal of the measurement circuit;

the first terminal of the first dissipation circuit element;

the first terminal of the second dissipation circuit element; and the first terminal of the third LED; and a first terminal of a second switch of the plurality of switches is configured to be coupled to:

the seventh sensing terminal of the measurement circuit;

the first terminal of the third dissipation circuit element; and the first terminal of the fourth dissipation circuit element.

8. The driving circuit of claim 7, further comprising a plurality of current sources, wherein:

a first terminal of a first current source of the plurality of current sources is configured to be coupled to:

the second terminal of the measurement circuit;

the second terminal of the first dissipation circuit element; and the first terminal of the second LED; and a first terminal of a second current source of the plurality of current sources is configured to be coupled to:

the eighth sensing terminal of the measurement circuit;

the second terminal of the third dissipation circuit element; and the first terminal of the fifth LED.

9. The driving circuit of claim 1, further comprising a controller configured to:

receive a measured voltage drop across the second LED from the measurement circuit, wherein the measured voltage drop across the second LED is measured by the measurement circuit using the second sensing terminal and the fourth sensing terminal of the measurement circuit; and adjust a current flowing through the second LED based on the measured voltage drop across the second LED.

10. A circuit comprising:

a driving circuit comprising:

a plurality of switches;

a plurality of current sources; and a measuring circuit comprising a plurality of sensing terminals;

a first dissipative circuit element coupled between a first switch of the plurality of switches and a first sensing terminal of the measuring circuit;

a first light-emitting diode (LED) coupled between the first sensing terminal and a second sensing terminal of the measuring circuit, wherein the first LED has a first terminal voltage, and wherein the second sensing terminal of the measuring circuit is coupled to a first current source of the plurality of current sources;

a second LED coupled between the first switch and a third sensing terminal of the measuring circuit, wherein the second LED has a second terminal voltage greater the first terminal voltage, and wherein the third sensing terminal of the measuring circuit is coupled to a second current source of the plurality of current sources; and a third LED coupled between a fourth sensing terminal and a fifth sensing terminal of the measuring circuit, wherein the third LED has a third terminal voltage greater the first terminal voltage, and wherein the fifth sensing terminal of the measuring circuit is coupled to a third current source of the plurality of current sources.

11. The circuit of claim 10, further comprising a second dissipative circuit element coupled between the first switch and the fourth sensing terminal of the measuring circuit.

12. The circuit of claim 11, further comprising:

a third dissipative circuit element coupled between a second switch of the plurality of switches and a sixth sensing terminal of the measuring circuit;

a fourth LED coupled between the sixth sensing terminal and the second sensing terminal of the measuring circuit, wherein the fourth LED has the first terminal voltage;

a fifth LED coupled between the second switch and the third sensing terminal of the measuring circuit, wherein the fifth LED has the first terminal voltage; and a sixth LED coupled between a seventh sensing terminal and the fifth sensing terminal of the measuring circuit, wherein the sixth LED has the first terminal voltage.

13. The circuit of claim 12, further comprising a fourth dissipative circuit element coupled between the second switch and the seventh sensing terminal of the measuring circuit.

14. The circuit of claim 13, wherein each of the first dissipative circuit element, the second dissipative circuit element, the third dissipative circuit element, and the fourth dissipative circuit element comprises a resistor or a diode.

15. The circuit of claim 13, wherein:

the first dissipative circuit element comprises a first diode;

the second dissipative circuit element comprises a second diode;

the third dissipative circuit element comprises a first resistor; and the fourth dissipative circuit element comprises a second resistor.

16. The circuit of claim 10, further comprising a controller configured to:

receive a measured voltage drop across the first LED from the measurement circuit, wherein the measured voltage drop across the first LED is measured by the measurement circuit using the first sensing terminal and the second sensing terminal of the measurement circuit; and adjust a current flowing through the first LED based on the measured voltage drop across the first LED.

17. The circuit of claim 10, wherein the measurement circuit comprises an analog-to-digital converter (ADC).

18. A method of operating a circuit comprising a measuring circuit, a first light-emitting diode (LED) coupled between a first sensing terminal and a second sensing terminal of the measuring circuit, a second LED coupled between the first sensing terminal and a third sensing terminal of the measuring circuit, and a first dissipative circuit element coupled in series with the first LED between the first sensing terminal and the second sensing terminal of the measuring circuit, a terminal between the first dissipative circuit element and the first LED being coupled to a fourth sensing terminal of the measuring circuit, wherein the second LED has a greater terminal voltage than the first LED, the method comprising:

measuring a voltage drop across the first LED using the second sensing terminal and the fourth sensing terminal of the measuring circuit;

determining a temperature of the first LED based on the measured voltage drop across the first LED; and calibrating a color of the first LED by adjusting a current through the first LED based on the determined temperature of the first LED.

19. The method of claim 18, further comprising:

measuring a voltage drop across the second LED using the first sensing terminal and the third sensing terminal of the measuring circuit;

determining a temperature of the second LED based on the measured voltage drop across the second LED; and calibrating a color of the second LED by adjusting a current through the second LED based on the determined temperature of the second LED.

20. The method of claim 18, wherein the temperature of the first LED is determined by a controller coupled to the measuring circuit.

21. The method of claim 18, wherein the current through the first LED is adjusted by a current source coupled to the first LED.

22. The method of claim 18, wherein:

the circuit further comprises a plurality of switches, a third LED, and a fourth LED; and the method further comprises:

multiplexing the first LED and the third LED using the plurality of switches; and multiplexing the second LED and the fourth LED using the plurality of switches.

* * * * *